United States Patent
Park et al.

(10) Patent No.: US 8,655,955 B2
(45) Date of Patent: *Feb. 18, 2014

(54) STREAM PROCESSING USING A CLIENT-SERVER ARCHITECTURE

(75) Inventors: Yoonho Park, Chappaqua, NY (US); Kenneth S. Sabir, Marrickville (AU)

(73) Assignee: International Business Machines Corporation, Armonk, NY (US)

( * ) Notice: Subject to any disclaimer, the term of this patent is extended or adjusted under 35 U.S.C. 154(b) by 321 days.

This patent is subject to a terminal disclaimer.

(21) Appl. No.: 13/212,538

(22) Filed: Aug. 18, 2011

(65) Prior Publication Data
US 2013/0046859 A1 Feb. 21, 2013

(51) Int. Cl.
*G06F 15/16* (2006.01)
(52) U.S. Cl.
USPC ............................. 709/205; 709/202; 709/230
(58) Field of Classification Search
USPC .......................................... 709/202, 205, 230
See application file for complete search history.

(56) References Cited

U.S. PATENT DOCUMENTS

| 8,285,780 B2 * | 10/2012 | Andrade et al. ............... 709/203 |
| 8,321,579 B2 * | 11/2012 | Aggarwal et al. ............. 709/231 |
| 8,478,874 B2 * | 7/2013 | Branson et al. ............... 709/226 |
| 2010/0205611 A1 | 8/2010 | Wagner et al. | |

* cited by examiner

*Primary Examiner* — David Lazaro
(74) *Attorney, Agent, or Firm* — Cuenot, Forsythe & Kim, LLC

(57) ABSTRACT

A system for responding to requests using stream processing can include a processor configured to initiate executable operations including receiving a server request from a server, wherein the server is configured to generate the server request responsive to a client request, generating a request identifier associated with the server request, and, responsive to the server request, sending a stream processing request derived from the server request to a first stream processing node. The stream processing request can include the request identifier. Responsive to receiving a create response message including a stream processing result and the request identifier from a second stream processing node, the stream processing result can be correlated with the server request. A write response message specifying the stream processing result can be sent to the server.

7 Claims, 4 Drawing Sheets

STREAM PROCESSING USING A CLIENT-SERVER ARCHITECTURE

BACKGROUND

One or more embodiments disclosed within this specification relate to stream processing.

In conventional data analysis, queries are applied against static data. Stream processing, in general, refers to a data processing technique in which changing data, referred to as a data stream or stream, can be evaluated. A data stream can be evaluated by applying largely static queries to the changing data stream, though the queries can be modified or updated over time. In some cases, the data stream that is queried can change rapidly. For example, a data stream that is to be evaluated can be viewed as a constant flow of information such as real time or near real time information. The nodes that implement stream processing can operate upon the data stream as opposed to operating upon static data that may be stored within a database or other data storage system.

BRIEF SUMMARY

One or more embodiments disclosed within this specification relate to stream processing and, more particularly, to stream processing using a client-server type of architecture.

An embodiment can include a system for responding to requests using stream processing. The system can include a computer readable storage medium having computer readable program code embodied therewith and a processor coupled to the computer readable storage medium. Responsive to executing the computer readable program code, the processor can be configured to perform executable operations. The executable operations can include receiving a server request from a server, wherein the server is configured to generate the server request responsive to a client request, generating a request identifier associated with the server request, and, responsive to the server request, sending a stream processing request derived from the server request to a first stream processing node. The stream processing request can include the request identifier. Responsive to receiving a create response message including a stream processing result and the request identifier from a second stream processing node, the stream processing result can be correlated with the server request. A write response message including the stream processing result can be sent to the server.

Another embodiment can include a system for responding to requests using stream processing. The system can include a computer readable storage medium having computer readable program code embodied therewith and a processor coupled to the computer readable storage medium. Responsive to executing the computer readable program code, the processor can be configured to perform executable operations. The executable operations can include, responsive to a client request, assigning a processing thread for handling the client request, establishing a return connection within the processing thread, and sending a server request derived from the client request to a stream server configured to interact with a plurality of stream processing nodes. The server request can include a thread identifier specifying the processing thread. The executable operations also can include maintaining the processing thread for handling the client request in an idle state pending a write response message from the stream server and, responsive to receiving the write response message including a stream processing result and the thread identifier from the stream server, returning the thread specified by the thread identifier to an active state. A client response including the stream processing result can be sent to the client over the return connection.

Another embodiment can include a computer program product for responding to requests using stream processing. The computer program product can include a computer readable storage medium having computer readable program code embodied therewith. The computer readable program code can include computer readable program code configured to receive a server request from a server, wherein the server is configured to generate the server request responsive to a client request, and computer readable program code configured to generate a request identifier associated with the server request. The computer readable program code further can include computer readable program code configured to, responsive to the server request, send a stream processing request derived from the server request to a first stream processing node. The stream processing request can include the request identifier. The computer readable program code can include computer readable program code configured to, responsive to receiving a create response message including a stream processing result and the request identifier from a second stream processing node, correlate the stream processing result with the server request. The computer readable program code also can include computer readable program code configured to send a write response message including the stream processing result to the server.

DETAILED DESCRIPTION

Figure 1:
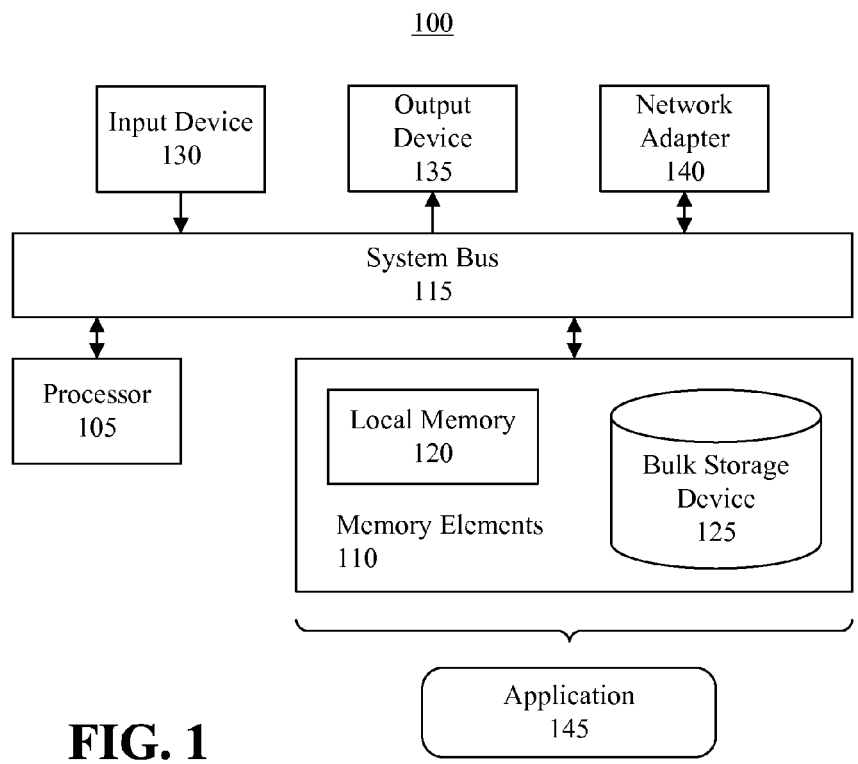
FIG. 1 is a first block diagram illustrating an exemplary data processing system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

One or more embodiments disclosed within this specification relate to stream processing and, more particularly, to stream processing using a client-server type of architecture. In accordance with the one or more embodiments disclosed herein, a system can be implemented that incorporates functionality of a hypertext-transfer protocol (HTTP) server within a stream processing system. Inclusion of HTTP server functionality, as described within this specification, facilitates the usage of stream processing technology within more conventional systems without having to re-design existing HTTP servers. The stream processing system can operate as a Web Service being available to service requests issued through a client-server type of architecture.

FIG. 1 is a first block diagram illustrating an exemplary data processing system (system) 100. System 100 can include at least one processor 105 coupled to memory elements 110 through a system bus 115. As such, system 100 can store program code within memory elements 110. Processor 105 can execute the program code accessed from memory elements 110 via system bus 115. In one aspect, for example, system 100 can be implemented as a computer that is suitable for storing and/or executing program code. It should be appreciated, however, that system 100 can be implemented in the form of any system including a processor and memory that is capable of performing the functions described within this specification.

Memory elements 110 can include one or more physical memory devices such as, for example, local memory 120 and one or more bulk storage devices 125. Local memory 120 refers to random access memory or other non-persistent memory device(s) generally used during actual execution of the program code. Bulk storage device 125 can be implemented as a hard drive or other persistent data storage device. System 100 also can include one or more cache memories (not shown) that provide temporary storage of at least some program code in order to reduce the number of times program code must be retrieved from bulk storage device 125 during execution.

Input/output (I/O) devices depicted as input device 130 and output device 135 optionally can be coupled to system 100. Examples of input device 130 can include, but are not limited to, for example, a keyboard, a pointing device such as a mouse, or the like. Examples of output device 135 can include, but are not limited to, for example, a monitor or display, speakers, or the like. Input device 130 and/or output device 135 can be coupled to system 100 either directly or through intervening I/O controllers. A network adapter 140 also can be coupled to system 100 to enable system 100 to become coupled to other systems, computer systems, remote printers, and/or remote storage devices through intervening private or public networks. Modems, cable modems, and Ethernet cards are examples of different types of network adapter 140 that can be used with system 100.

As pictured in FIG. 1, memory elements 110 can store an application 145. It should be appreciated that system 100 further can execute an operating system (not shown) that can facilitate execution of application 145. Application 145, being implemented in the form of executable program code, can be executed by system 100, e.g., by processor 105. Responsive to executing application 145, system 100 can be configured to perform one or more operations to be described herein in further detail.

In one aspect, for example, system 100 can represent a client data processing system. In that case, application 145 can represent a client application that, when executed, configures system 100 to perform the various functions described herein with reference to a "client." Examples of a client can include, but are not limited to, a personal computer, a portable computer, a mobile phone, or the like.

In another aspect, system 100 can represent a server. For example, system 100 can represent an HTTP server in which case application 145, when executed, can configure system 100 to perform HTTP server operations. In another aspect, system 100 can represent a stream processing node of a stream processing system, such as a stream processing node or an HTTP stream server to be described in greater detail within this specification. Accordingly, application 145, when executed, can configure system 100 to perform HTTP stream server and/or stream processing node operations as the case may be.

Figure 2:
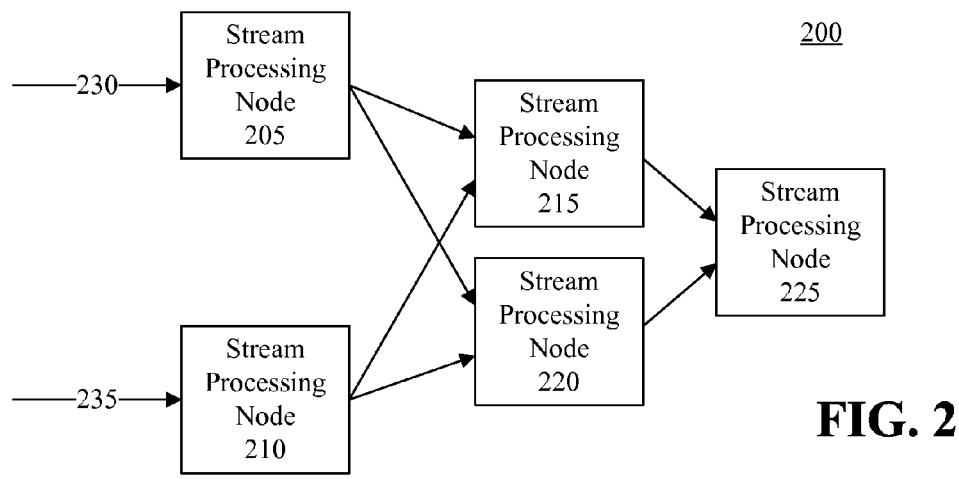
FIG. 2 is a block diagram illustrating a system for stream processing in accordance with an embodiment disclosed within this specification.

FIG. 2 is a block diagram illustrating a system 200 for stream processing in accordance with an embodiment disclosed within this specification. In general, a stream processing system such as system 200 can receive and process one or more data streams.

A data stream can refer to a flow of data that can be a constant flow or near constant flow of data. In some cases, the data stream can be a real time flow of data as can be received from a sensor configured to continually output readings or measurements. In another example, a data stream can be market data that is updated and sent in real time or in near real time specifying security prices. Other examples of a data stream can include live news feeds, whether in text, audio, visual, or audiovisual form, diagnostic data, weather data, etc. In general, a data stream represents a relatively constant flow of data that does not correspond or comply with the conventional client-server request response type of information flow commonly found or implemented with Internet-based Web sites. In general, a data stream is unidirectional and flows out from the particular node that is generating the data stream.

As shown, system 200 can include a plurality of stream processing nodes 205, 210, 215, 220, and 225. Each of stream processing nodes 205-225 can be communicatively linked through a network. Stream processing nodes 205 and 210 can be configured to receive data streams 230 and 235 respectively. In one aspect, data streams 230 and/or 235 can originate from outside of system 200. In general, stream processing nodes such as stream processing nodes 205 and 210 that receive data streams from sources external to the system can be referred to as "sources." Each of stream processing nodes 205-225 can be configured to operate asynchronously. For example, each of stream processing nodes 205-225 can be configured to include a separate processor and have a separate work queue.

Stream processing node 205 can apply a data processing technique to data stream 230 to determine one or more metrics or extract data from data stream 230. The resulting metrics and/or extracted data can be forwarded to each of stream processing nodes 215 and 220 as shown in the form of output data streams. Similarly, stream processing node 210 can apply a data processing technique to data stream 235 to determine one or more metrics or extract data from data stream 235. The resulting metrics and/or extracted data can be forwarded to each of stream processing nodes 215 and 220 as shown in the form of output data streams.

Stream processing node 215 can apply a data processing technique to the output data streams received from stream processing nodes 205 and 210 and output one or more determined metrics and/or extracted data in the form of a further output data stream to stream processing node 225. Similarly, stream processing node 220 can apply a data processing technique to the data streams received from stream processing nodes 205 and 210 and output one or more determined metrics and/or extracted data in the form of a further data stream to stream processing node 225.

Stream processing node 225 can make a final decision or determine a final result based upon data received from each of stream processing nodes 215 and 220. Stream processing node 225 further can be configured to send information, e.g., a result, to a destination or other data processing system. A stream processing node of a stream processing system that is configured to send information external to the system can be referred to as a "sink."

In an embodiment, system 200, being a stream processing system, can be characterized in that little, if any, data that is processed by stream processing nodes 205-225 need be stored. Within a conventional system conforming to a client-server architecture, large quantities of data can be received and stored. Typically data is stored within a database. Queries then can be executed against the database, thereby requiring the server(s) to have large amounts of long term or fixed storage.

By comparison, system 200 can operate upon received data streams 230 and 235 without having to save data from data streams 230 and/or 235. Each of stream processing nodes 205-225 can be configured to receive a data stream, perform processing upon that data stream, and generate an output data stream that can be sent or provided to one or more other nodes. Still, it should be appreciated that one or more intermediate results and/or final results as determined by one or more of stream processing nodes 205-225 can be stored if so desired.

The various data streams generated by stream processing nodes 205-225 can include requests or other messages within each respective data stream that is output. The messages, for example, allow stream processing nodes 205-225 to communicate particular operational data and/or instructions relating to system level functions or operating states of stream processing nodes 205-225.

In one aspect, each of stream processing nodes 205-225 can be implemented within a different data processing system. The one or more embodiments disclosed within this specification, however, are not intended to be limited in this regard. In another aspect, for example, one or more of stream processing nodes 205-225 can be implemented within a same data processing system. For instance, two or more stream processing nodes such as stream processing node 215 and stream processing node 220 can be implemented within a single data processing system.

As shown in FIG. 2, system 200 can receive data streams within stream processing nodes 205 and 210 (sources) and send a result from stream processing node 225 (sink). System 200 differs from conventional client-server systems where the request from a client is received by a node and that same node provides a response back to the client. By providing the response to the client from the same node that receives the request, affinity in the form of a connection or communication link between client and server can be maintained. Within conventional stream processing system, as demonstrated with reference to FIG. 2, the data flows into one or more stream processing nodes and exits from one or more different stream processing nodes. Accordingly, maintaining affinity with a client to support a request-response type of transactional model used in client-server type systems is not feasible with conventional stream processing systems.

For a stream processing system to behave like a Web service that observes the client-server model or architecture, affinity must be maintained between the client and the source and the client and the sink of the stream processing system so that the sink knows the particular client to which the result is to be sent. In one embodiment, affinity with a requesting client can be maintained by propagating client context information among the stream processing nodes so that the association between the stream processing nodes and the client and/or client request is not lost. For example, to preserve the ability to provide a response to a requesting client, the output generated by each of stream processing nodes 205-225 can include context information for the particular client request that initiated the stream processing being performed. When affinity, e.g., context information for a received client request that identifies the client and where to send a response, is maintained, the stream processing system can determine where to send the client response.

Figure 3:
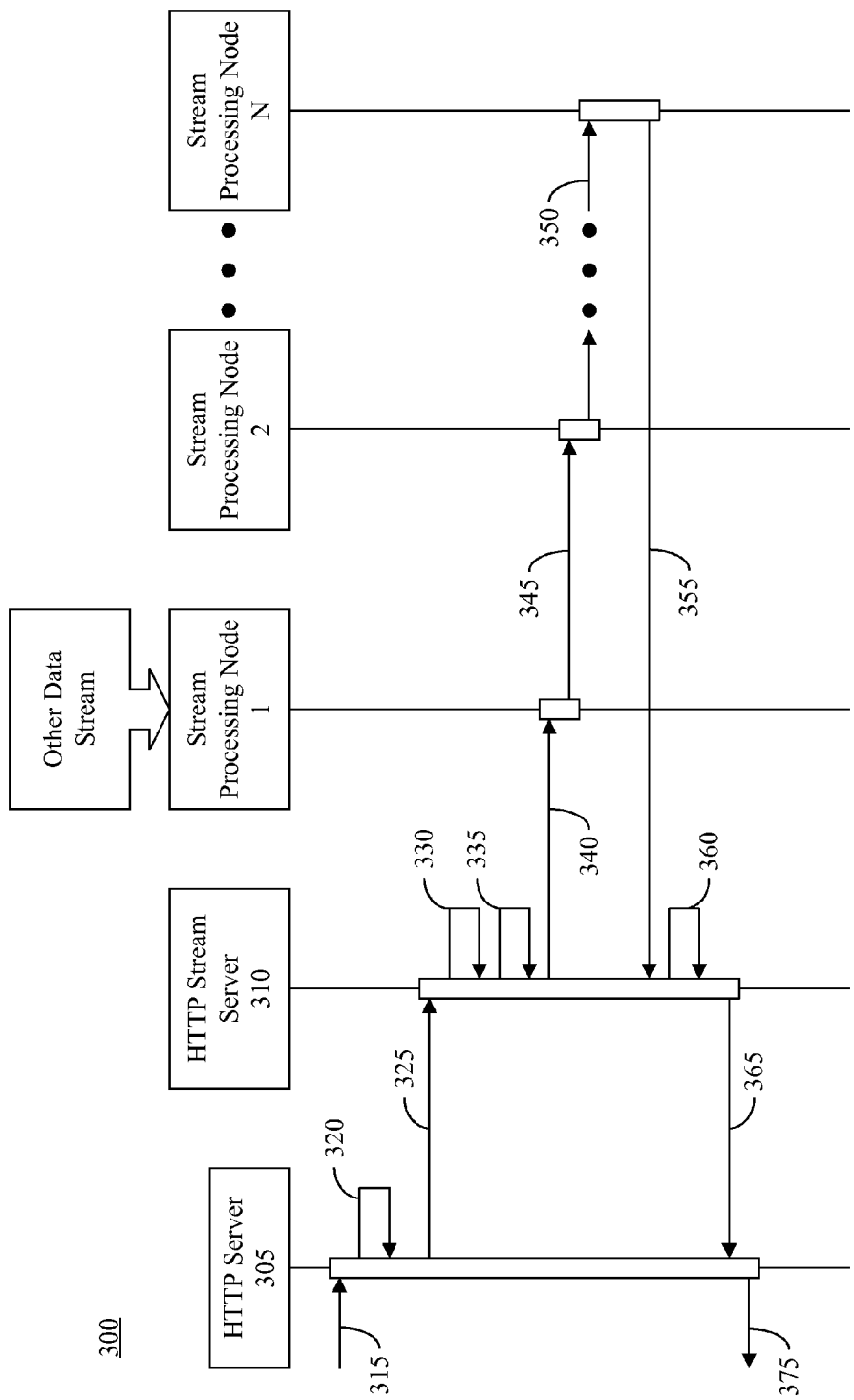
FIG. 3 is a block diagram illustrating a system for stream processing in accordance with another embodiment disclosed within this specification.

FIG. 3 is a block diagram illustrating a system 300 for stream processing in accordance with an embodiment disclosed within this specification. As shown, system 300 can include an HTTP server 305, an HTTP stream server (stream server) 310, and one or more stream processing nodes labeled 1-N, where "N" is an integer value greater than or equal to one. It should be appreciated that while system 300 is shown to include three stream processing nodes, e.g., stream processing nodes 1, 2, . . . , N, system 300 can include fewer stream processing nodes, e.g., 1 or 2, or more stream processing nodes configured for stream processing as described with reference to FIG. 2. HTTP server 305, stream server 310, and stream processing nodes 1, 2, . . . , N can be communicatively linked through a network.

In general, system 300 illustrates an embodiment in which client context information can be used to maintain affinity between a requesting client (not shown), e.g., the client that issues the client request, and the source and sink of system 300. Within system 300, stream server 310 can be configured to function as both source and sink to aid in processing HTTP requests. By passing the client context information from HTTP server 305, to stream server 310, and among stream processing nodes 1, 2, . . . , N of system 300 as stream processing occurs, the stream processing results can be correlated with the original client request and provided back to the client. As discussed, each of stream processing nodes 1, 2, . . . , N can be configured to operate asynchronously. Cooperative operation of HTTP server 305 and stream server 310 allows system 300 to appear, at least to external systems such as the client, as a synchronous system.

HTTP server 305 can be configured to receive a client request 315 from the client. Client request 315 can request data that can be computed or determined by a stream processing system such as system 300. In one aspect, HTTP server 305 can assign a processing thread to handle the processing of client request 315. The processing thread for handling client request 315 can be identified by a thread identifier within HTTP server 305.

Within the processing thread, HTTP server 305 can create a return connection 320 to the client. For example, HTTP server 305 can be configured to create a return connection 320 in the form of a return TCP/IP socket for sending a client response 375 from HTTP server 305 to the client. HTTP server 305, for example, can create return connection 320 using the client address and port. It should be appreciated that the thread for handling client request 315 that is also responsible for creating return connection 320 effectively stores return connection 320. For example, the processing thread within HTTP server 305 can store or include return connection information, e.g., the information necessary for establishing return connection 320.

HTTP server 305 further can submit a server request 325 to stream server 310. Server request 325 can include client context information. In an embodiment, the client context information specified by server request 325 can include some or all of client request 315. In one aspect, client context information also can include return connection information, e.g., a return connection reference or other information that identifies return connection 320 with the client. In one example, the return connection information can be specified by, or sent as, the thread identifier specifying the processing thread within HTTP server 305 that is handling client request 315. By HTTP server 305 providing the client context information, stream server 310 can maintain affinity with the client despite not receiving any client requests directly from the client.

In one example, server request 325 can be implemented in the form of a "handle" method. HTTP server 305 can create a request object and a response object specifying the client context information. For example, the request object can include the entirety of the client request, a portion of the client request, one or more parameters of the client request such as cookies, and/or other related client information. The response object can specify the return connection information for the client request. For example, the response object can specify the client address and port of the return TCP/IP socket. In another example, as noted, the response object can specify the thread identifier.

The request object and the response object can be passed from HTTP server 305 to one or more other processing nodes, e.g., stream server 310. HTTP server 305 can invoke the handle method and pass stream server 310 one or more arguments, e.g., the request object and the response object, responsive to client request 315 and creation of return connection 320. In an embodiment, HTTP server 305 can be configured to block the handle method until the handle method returns. For example, the processing thread within which the handle method executes can be idled.

The processing thread within HTTP server 305 can be idled using any of a variety of know programming techniques. For example, condition variables can be used to idle a processing thread. The processing thread that is idled effectively waits on the value of a conditional variable to change, thereby entering a sleep or idle state. When an event occurs, such as the return of the handle method in terms of receiving a stream processing result from stream server 310, another processing thread that is active can signal the idle processing thread that is waiting on the condition variable to become active. Accordingly, the idled thread can awake and resume activity.

Stream server 310, can be configured to populate the response object received from HTTP server 305 as part of server request 325. When the handle method returns, e.g., when stream server 310 sends the populated response object back to HTTP server 305, HTTP server 305 can be configured to send a client response 375 back to the client.

Continuing, responsive to server request 325, stream server 310 can perform a create request identifier operation 330 that generates a request identifier. Stream server 310, for example, can create a request identifier that uniquely identifies or corresponds to server request 325 and, thus, client request 315. In an embodiment, the request identifier, which can be an integer value, can be generated using a hashing function. For example, stream server 310 can hash client context information derived from the request object, the response object, or from both the request object and the response object.

Stream server 305 can perform a store operation 335 where stream server 310 can store the request identifier in association with the client context information received within server request 325. For example, stream server 310 can store the client context information, or a portion thereof, within a context dictionary stored in memory. The context dictionary can be keyed according to the request identifier. Accordingly, the request identifier can be used to index into the context dictionary to retrieve the associated client context information when needed. The stored client context information can include the response object and/or the thread identifier. Responsive to receiving any stream processing results from stream processing nodes 1, 2, . . . , N that include a request identifier, for example, stream server 310 can correlate the received stream processing results with the appropriate server request, client, client request, and/or return connection information based upon the request identifier within the stream processing results.

Having generated and stored the request identifier, stream server 310 can be configured to generate and send a stream processing request 340 to stream processing node 1. In one example, stream processing request 340 can be a "render" method that is passed from stream server 310 among stream processing nodes 1, 2, . . . , N. The render method can include a plurality of parameters including a universal resource identifier (URI) or a universal resource locator (URL) identifying stream server 310, client request 315 or a portion thereof (e.g., parameters of client request 315 such as cookies), and the request identifier generated by stream server 310.

As shown, stream processing node 1 can be configured to receive a data stream denoted as "other data stream" to illustrate that in addition to generating data streams among stream processing nodes 1, 2, . . . , N, one or more of stream processing nodes 1, 2, . . . , N can receive a data stream from an external node, e.g., another system, sensor, or the like. In any case, each of stream processing nodes 1, 2, . . . , N can be configured to process at least an output data stream from another stream processing node of system 300.

Responsive to receiving stream processing request 340, stream processing node 1 can be configured to perform one or more stream processing functions and generate a partial response. The partial response from stream processing node 1, referred to as partial response 1, can be included within a further stream processing request 345 that can be generated and sent from stream processing node 1 to stream processing node 2. For example, stream processing node 1 can generate and send stream processing request 345. Stream processing request 345 can be implemented in the form of a further render method having arguments such as the URI or the URL of stream server 310, client request 315 or a portion thereof, the request identifier generated by stream server 310, and partial response 1.

Responsive to receiving stream processing request 345, stream processing node 2 can be configured to perform one or more stream processing functions and generate a partial response. The partial response from stream processing node 2, referred to as partial response 2, can be included within a further stream processing request 350 that can be generated and sent from stream processing node 2 to stream processing node N in this example. For example, stream processing node 2 can generate and send stream processing request 350. Stream processing request 350 can be implemented in the form of a further render method having arguments such as the URI or the URL of stream server 310, client request 315 or a portion thereof, the request identifier generated by stream server 310, partial response 1, and partial response 2.

Responsive to receiving stream processing request 350, stream processing node N can be configured to perform one or more stream processing functions and generate a partial response. The partial response from stream processing node N, referred to as partial response N, can be included within a create response message 355 that can be sent from stream processing node N to stream server 310. Create response message 355 can include, or specify, for example, the request identifier and a response body. The response body can be considered to be a complete response, e.g., a stream processing result in answer to, to client request 315. More particularly, the response body can include partial response 1, partial response 2, . . . , partial response N, thereby forming the stream processing result.

In another embodiment, not every node needs to contribute a partial response that is included within the stream processing result. For example, one or more stream processing nodes can be configured to generate intermediate results that can be used or consumed by other "downstream" stream processing nodes. The intermediate results need not be included within the stream processing result. In this sense, however, such a stream processing node still can be said to have contributed a partial response to the stream processing result.

It should be appreciated that the various nodes of system 300 such as stream processing node 1, stream processing node 2, through stream processing node N can be configured or programmed to direct output to a particular other node. For example, stream processing node 1 can be configured to direct an output data stream that can include stream processing request 345 to stream processing node 2. Stream processing node 2 can be configured to direct an output data stream that can include stream processing request 350 to stream processing node N. Stream processing node N can be configured as the last of the stream processing nodes and, as such, can be configured to send create response message 355 to stream server 310.

Continuing, responsive to receiving create response message 355, stream server 310 can be configured to perform a retrieve response operation 360. Retrieve response operation 360 can recall the previously stored client context information. As noted, create response message 355 can specify the request identifier, which can be used to index into the context dictionary to retrieve the stored client context information.

Stream server 310 further can generate and send a write response message 365 to HTTP server 305. Stream server 310 can generate write response message 365 that can specify retrieved client context information, e.g., the thread identifier, and the response body. For example, stream server 305 can populate the stream processing result as specified in the response body received from stream processing node N within the response object portion of the client context information retrieved from the context dictionary and forward the resulting message in the form of write response message 365 to HTTP server 305. As noted, the write response message 365 can further specify the thread identifier. In an embodiment, the thread identifier can be included within the response object that is stored within the context dictionary. In this regard, thread identifier can already be within the response object prior to population of the response body therein.

In an embodiment, write response message 365 can be considered the return of the handle method to HTTP server 305. Responsive to receiving write response message 365, HTTP server 305 can be configured to stop blocking the handle method and continue operation to respond to client request 315. As noted, for example, HTTP server 305 can awaken the idled processing thread as determined from the thread identifier received within write response message 365. HTTP server 305, having awakened the processing thread specified by the thread identifier, can continue processing client request 315 to generate and send client response 375 to the client. The processing thread, as noted, includes or specifies information for return connection 320, over which HTTP server 305 can send client response 375. Client response 375 can include the stream processing result as determined by system 300, e.g., by stream processing node N.

Within FIG. 3, the rectangular boxes extending downward beneath each node indicate the portion of time in which that node is involved in, or processing, the transaction. As shown, HTTP server 305 is involved from the time that client request 315 is received to the time that client response 375 is sent. Stream server 310, which interacts with stream processing nodes 1, 2, ..., N, is involved less time than HTTP server 305. Each of stream processing nodes 1, 2, ..., N is involved less time than stream server 310.

Figure 4:
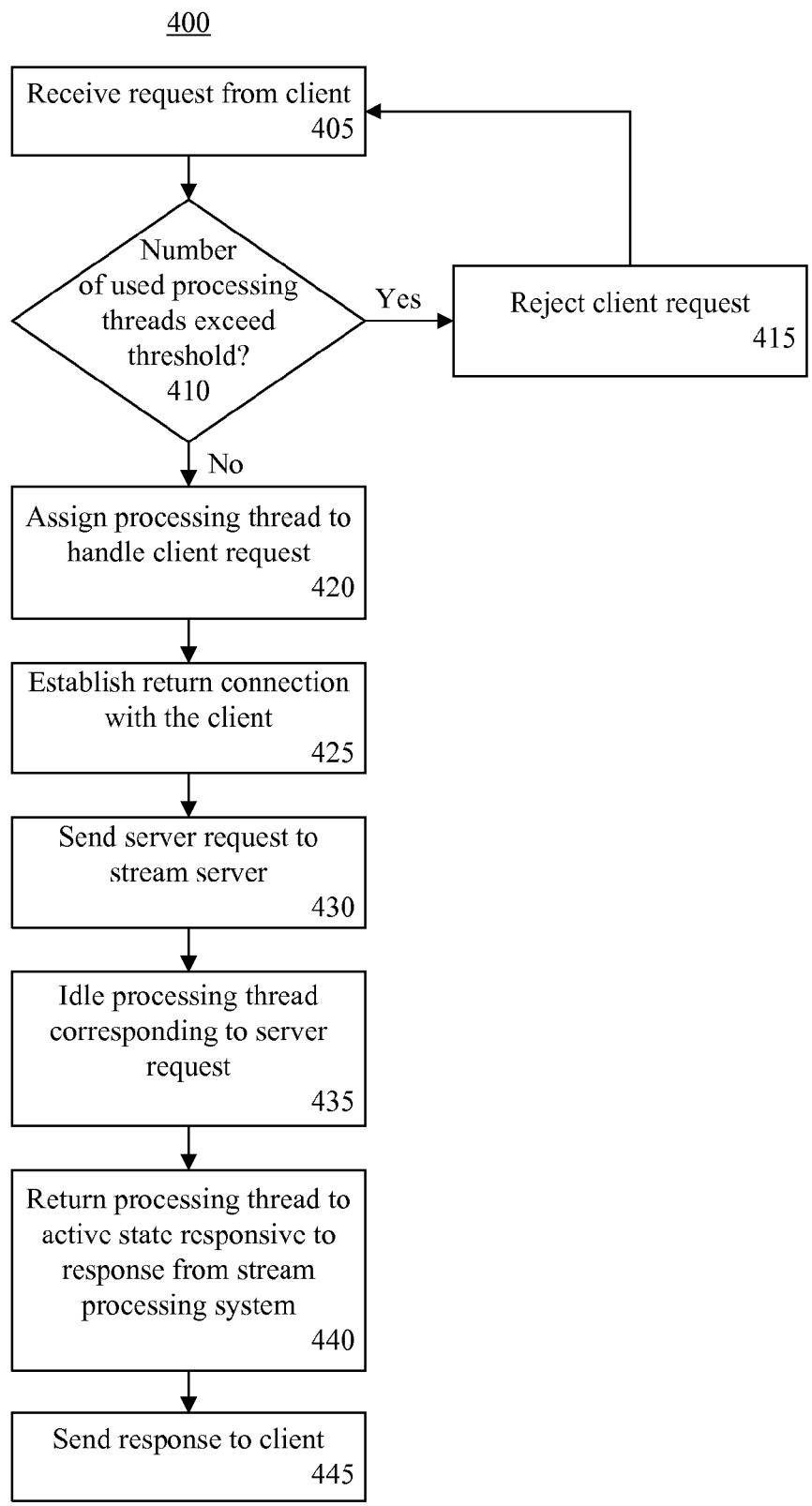
FIG. 4 is a flow chart illustrating a method of responding to requests using stream processing in accordance with another embodiment disclosed within this specification.

FIG. 4 is a flow chart illustrating a method 400 of responding to requests using stream processing in accordance with another embodiment disclosed within this specification. Method 400 can be implemented by a system as described with reference to FIGS. 1-3. More particularly, method 400 illustrates a method of processing that can be implemented by the HTTP server described with reference to FIG. 3.

Method 400 can begin in step 405, where the HTTP server can receive a client request from a client. In step 410, the HTTP server can determine whether a number of processing threads currently used exceeds a threshold number of processing threads. When the number of processing threads being used exceeds the threshold number of processing threads, method 400 can proceed to step 415. In step 415, the HTTP server can reject the incoming client request or simply not respond. By limiting the number of available processing threads, the HTTP server can prevent flooding of the stream processing system. After step 415, method 400 can loop back to step 405 to process further client request. When the number of processing threads used within the HTTP server does not exceed the threshold number of processing threads, method 400 can proceed to step 420.

In step 420, responsive to the client request, the HTTP server can assign a processing thread to handle the client request. In one aspect, HTTP server can create a new processing thread and assign the newly created processing thread to handle the client request. In another aspect, HTTP server can assign an available processing thread to handle the client request.

In step 425, responsive to the client request, the HTTP server can establish a return connection with the client. The HTTP server can create the return connection within the assigned processing thread. As noted, the processing thread can be specified by the thread identifier. In step 430, the HTTP server can send a server request to the stream server. For example, the HTTP server can implement a handle method that executes on the assigned processing thread. The server request can include, for example, the client request, or a portion thereof, and the thread identifier.

In step 435, the HTTP server can begin waiting for a result from the stream server. In an embodiment, the HTTP server can idle the processing thread assigned to the client request. As discussed with reference to FIG. 3, for example, the HTTP server can await a stream processing result, e.g., a return of the handle method, from the stream server prior to responding to the client. Accordingly, the HTTP server can enter a wait state, at least with regard to the client request, where the processing thread assigned to the client request is maintained in an idle state until a response is received from the stream server. The HTTP server, however, can continue to service other received client requests while awaiting the response from the stream server.

In step 440, responsive to receiving the write response message from the stream server specifying the thread identifier, the HTTP server can return the processing thread specified by the thread identifier, e.g., the processing thread that was idled, to an active state. As discussed, the write response message can include the response object, which also can include the stream processing result from the stream processing nodes and the thread identifier. The HTTP server can return the idled thread specified by the thread identifier to an active state. It should be appreciated that since the HTTP server can service a plurality of client requests concurrently and have a plurality of outstanding server requests, the HTTP server can have more than one idle processing thread in existence at the same time. Accordingly, the HTTP server can select one of the plurality of idle processing threads as specified by the thread identifier in the write response message. The HTTP server can return the selected idle processing thread to an active state responsive to receiving the stream processing results for that processing thread. In step 445, the HTTP server can send the client response specifying the stream processing result as determined by the stream processing nodes, to the client over the return connection specified within the activated processing thread.

It should be appreciated that when an error occurs, e.g., a write response message is not received from the stream server within a predetermined or minimum amount of time, the HTTP server can be configured to release the processing thread assigned to handle the client request so that the processing thread is available for other processing tasks. For example, after expiration of the minimum amount of time, the HTTP server can presume that an error occurred within the stream server and/or one or more of the stream processing nodes so that a write response message from the stream server will not be forthcoming.

Figure 5:
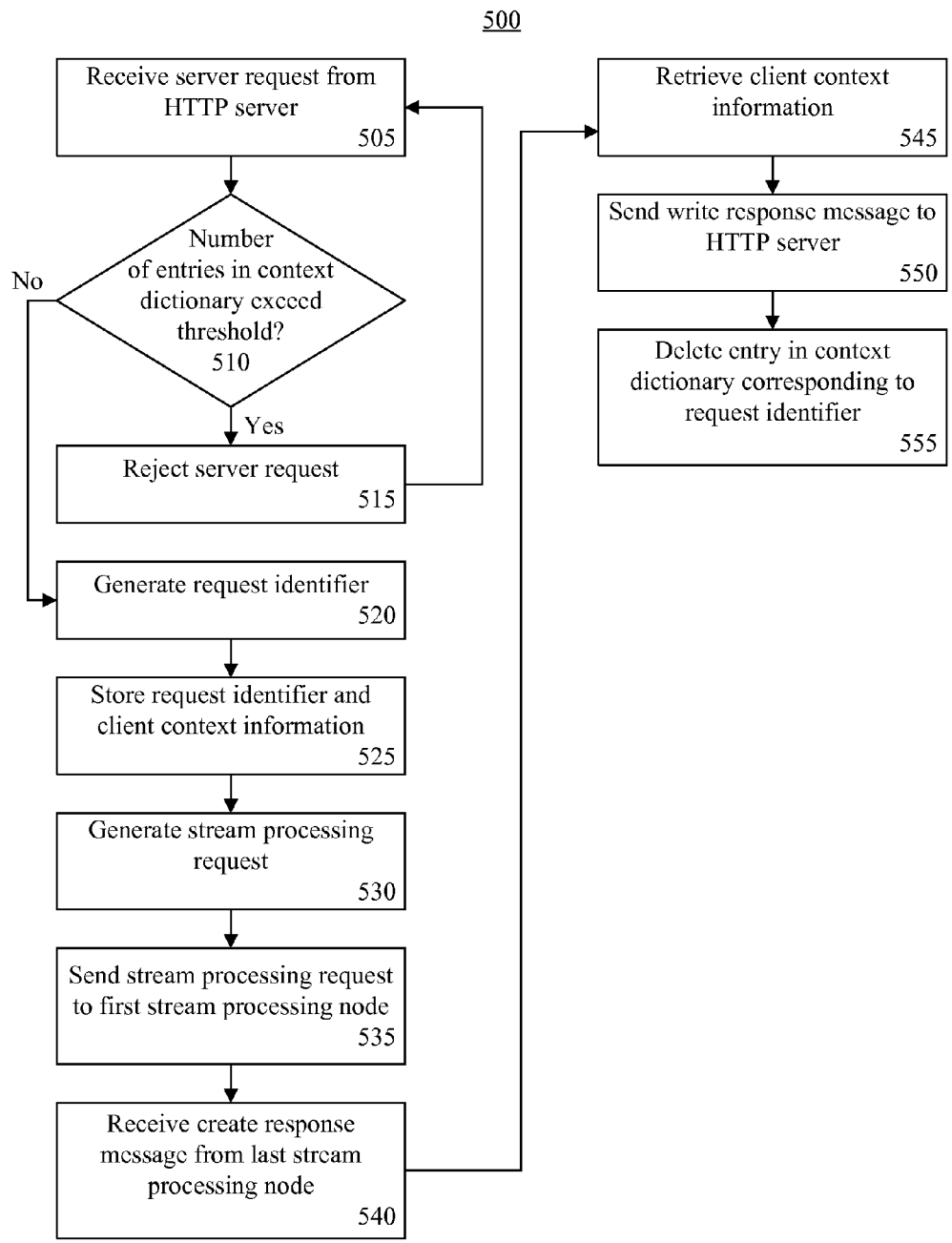
FIG. 5 is a flow chart illustrating a method of responding to requests using stream processing in accordance with another embodiment disclosed within this specification.

FIG. 5 is a flow chart illustrating a method 500 of responding to requests using stream processing in accordance with another embodiment disclosed within this specification. Method 500 can be implemented by a system as described with reference to FIGS. 1-3. More particularly, method 500 illustrates a method of processing that can be implemented by the stream server described with reference to FIG. 3. Method

500, for example, can be performed concurrently with method 400. More particularly, method 500 can be performed while the processing thread is idle or the handle method within the HTTP server is blocked.

Method 500 can begin in step 505, where the stream server can receive the server request from the HTTP server. For example, the stream server can be configured to listen on a port for the server request from the HTTP server. In step 510, the stream server can determine whether a number of entries in the context dictionary is less than a threshold number of entries. When the number of entries in the context dictionary is less than the threshold number of entries, method 500 can proceed to step 515. When the number of entries in the context dictionary is not less than the threshold number of entries, method 500 can proceed to step 520.

In step 515, the stream server can reject the server request received from the HTTP server. Limiting the number of entries in the context dictionary can aid in preventing the stream processing system from being overloaded with client request. After step 515, method 500 can loop back to step 505 to continue processing further server requests from the HTTP server.

In step 520, the stream server can generate a request identifier in response to the server request from the client context information specified therein. In step 525, the stream server can store the request identifier and the client context information. As noted, for example, the stream server can store the client context information within a context dictionary as an entry that can be keyed or indexed using the request identifier.

In step 530, the stream server can generate a stream processing request. The stream server can include the request identifier within the stream processing request. The request identifier can be included within the output data stream generated by each stream processing node. Propagation of identifying information allows stream processing results to be correlated with the client request and further allows the stream processing system to maintain affinity with the client.

In step 535, the stream server can send the stream processing request to a first stream processing node. In step 540, the stream server can receive a create response message as part of the output data stream from a last or final stream processing node involved in the stream processing that is being performed in response to the client request. As noted, the create response message can specify the request identifier and the stream processing result from the stream processing nodes.

In step 545, the stream server can retrieve the client context information. For example, the stream server can retrieve the client context information from the context dictionary using the request identifier from the create response message. In step 550, the stream server can send a write response message back to the HTTP server. As noted, the stream server can utilize the client context information that is retrieved from the context dictionary to determine where to direct the write response message. The client context information can include the thread identifier, which the stream server can include within the write response message sent to the HTTP server. Accordingly, the HTTP server can send a client response including the stream processing result from the stream processing system as specified within the response object back to the client.

In step 555, the stream server can delete the entry in the context dictionary corresponding to the request identifier that was processed, thereby reducing the number of entries in the context dictionary. It should be appreciated that while not illustrated in FIG. 5, further error handling procedures can be implemented within the stream server. For example, in one aspect, entries in the context dictionary can be deleted or purged after a predetermined, or minimum, amount of time. After expiration of that minimum amount of time, the stream server can presume that an error occurred within one or more of the stream processing nodes and that a create response message will not be forthcoming.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A system for responding to requests using stream processing, the system comprising:
    a computer readable storage medium having computer readable program code embodied therewith; and
    a processor coupled to the computer readable storage medium, wherein responsive to executing the computer readable program code, the processor is configured to perform executable operations comprising:
    receiving a server request from a server, wherein the server is configured to generate the server request responsive to a client request;
    generating a request identifier associated with the server request;
    responsive to the server request, sending a stream processing request derived from the server request to a first stream processing node, wherein the stream processing request includes the request identifier;
    responsive to receiving a create response message comprising a stream processing result and the request identifier from a second stream processing node, correlating the stream processing result with the server request; and
    sending a write response message comprising the stream processing result to the server.

2. The system of claim 1, wherein the processor is further configured to perform an executable operation comprising:
    responsive to receiving the write response message, sending a client response comprising the stream processing result to the client.

3. The system of claim 2, wherein the processor is further configured to perform an executable operation comprising:
    propagating the stream processing request among the first and the second stream processing nodes, wherein each stream processing node that handles the stream processing request contributes a partial response.

4. The system of claim 2, wherein the server request comprises client context information, wherein the processor is further configured to perform an executable operation comprising:
- correlating the stream processing request with the server request by generating the request identifier from the client context information; and
- storing the request identifier in association with the client context information.

5. A computer program product for responding to requests using stream processing, the computer program product comprising:
- a computer readable storage medium having computer readable program code embodied therewith, the computer readable program code comprising:
- computer readable program code configured to receive a server request from a server, wherein the server is configured to generate the server request responsive to a client request;
- computer readable program code configured to generate a request identifier associated with the server request;
- computer readable program code configured to, responsive to the server request, send a stream processing request derived from the server request to a first stream processing node, and wherein the stream processing request includes the request identifier;
- computer readable program code configured to, responsive to receiving a create response message comprising a stream processing result and the request identifier from a second stream processing node, correlate the stream processing result with the server request; and
- computer readable program code configured to send a write response message comprising the stream processing result to the server.

6. The computer program product of claim 5, wherein the computer readable program code further comprises:
- computer readable program code configured to propagate the stream processing request among the first and the second stream processing nodes, wherein each stream processing node that handles the stream processing request contributes a partial response.

7. The computer program product of claim 5, wherein the server request comprises client context information, wherein the computer readable program code further comprises:
- computer readable program code configured to correlate the stream processing request with the server request by generating the request identifier from the client context information; and
- computer readable program code configured to store the request identifier in association with the client context information.

* * * * *